United States Patent
Yamaguchi

(10) Patent No.: US 9,420,138 B2
(45) Date of Patent: Aug. 16, 2016

(54) PRINTER

(71) Applicant: Oki Data Corporation, Tokyo (JP)

(72) Inventor: Yasunaga Yamaguchi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/694,070

(22) Filed: Apr. 23, 2015

(65) Prior Publication Data

US 2015/0310320 A1 Oct. 29, 2015

(30) Foreign Application Priority Data

Apr. 25, 2014 (JP) .................... 2014-091725

(51) Int. Cl.
*G06K 15/00* (2006.01)
*H02H 3/00* (2006.01)
*H04N 1/00* (2006.01)
*B41J 29/00* (2006.01)
*G03G 15/00* (2006.01)
*B41J 29/393* (2006.01)

(52) U.S. Cl.
CPC ............ *H04N 1/00891* (2013.01); *B41J 29/00* (2013.01); *B41J 29/393* (2013.01); *G03G 15/00* (2013.01); *H04N 1/0032* (2013.01); *H04N 1/00904* (2013.01); *H04N 1/00907* (2013.01); *H04N 1/00952* (2013.01); *H04N 2201/0094* (2013.01)

(58) Field of Classification Search
USPC .................. 358/1.13; 361/679.01; 363/21.12; 307/104
See application file for complete search history.

(56) References Cited

U.S. PATENT DOCUMENTS

| | | | | |
|---|---|---|---|---|
| 4,905,230 A * | 2/1990 | Madge | ................. | H04L 12/42 370/222 |
| 5,995,397 A * | 11/1999 | Kim | ................. | G03G 15/80 363/21.12 |
| 2009/0003869 A1* | 1/2009 | Takahashi | .......... | G03G 15/5004 399/75 |
| 2010/0013323 A1* | 1/2010 | Chung | ................. | H02H 11/005 307/125 |
| 2011/0131434 A1* | 6/2011 | Nakaya | ............... | G03G 15/2039 713/320 |
| 2012/0151231 A1* | 6/2012 | Hatta | ...................... | G06F 1/266 713/320 |
| 2012/0321338 A1* | 12/2012 | Kosaka | ............. | G03G 15/5004 399/88 |
| 2013/0024712 A1* | 1/2013 | Akagi | .................... | G11C 5/063 713/330 |
| 2013/0038990 A1* | 2/2013 | Chen | ........................ | G06F 1/26 361/679.01 |
| 2013/0216281 A1* | 8/2013 | Suzuki | ............... | G03G 15/1605 399/314 |
| 2014/0203661 A1* | 7/2014 | Dayan | .................... | H01F 38/14 307/104 |
| 2015/0093138 A1* | 4/2015 | Tashiro | .............. | G03G 15/0863 399/90 |
| 2015/0188443 A1* | 7/2015 | Takeda | .................. | F03D 9/003 416/146 R |

FOREIGN PATENT DOCUMENTS

JP 2006-076770 A 3/2006

* cited by examiner

*Primary Examiner* — Jerome Grant, II
(74) *Attorney, Agent, or Firm* — Mots Law, PLLC

(57) ABSTRACT

A printer includes a main apparatus, a device including a drive unit operable by electric power from the main apparatus; and a connection member. The main apparatus includes a first power source and a first output port. The device includes: a first input port from which the electric power from the first power source is inputted; a protector with a first end connected to the first input port; a second output port connected to a second end of the protector and to output electric power from the protector to the outside thereof; and a second input port connected to the drive unit. The connection member includes a first connecting path to connect the first output and input ports and a second connecting path to connect the second output port to the second input port to supply the output from the second output port to the second input port.

14 Claims, 7 Drawing Sheets

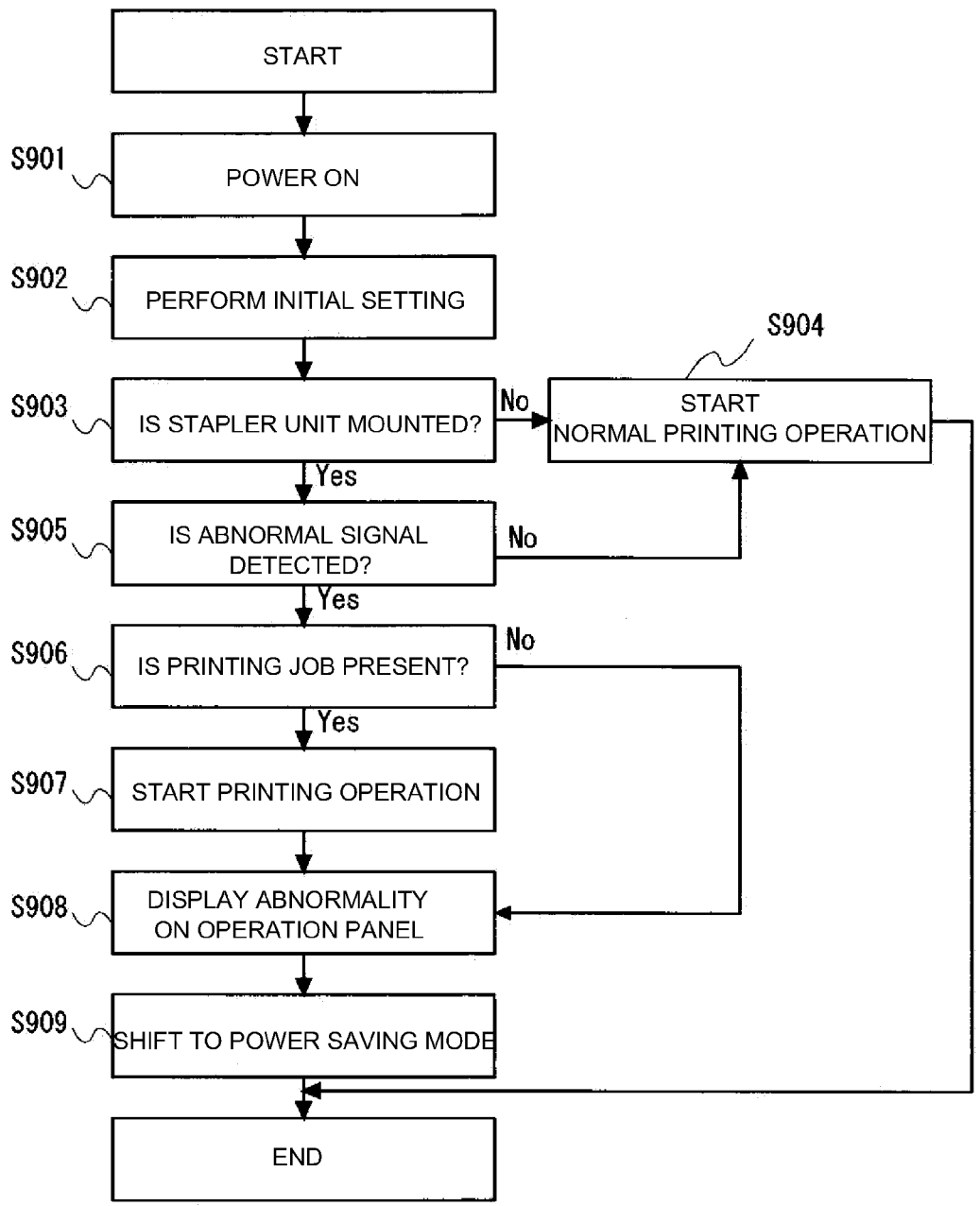

PRINTER

CROSS REFERENCE TO RELATED APPLICATIONS

This application claims priority based on 35 USC 119 from prior Japanese Patent Application No. 2014-091725 filed on Apr. 25, 2014, entitled "PRINTER", the entire contents of which are incorporated herein by reference

BACKGROUND OF THE INVENTION

1. Field of the Invention
The disclosure relates to a printer.
2. Description of Related Art
Conventionally, for expanding functions of printers, an option device is additionally mounted to a printer (see Japanese Laid-open Patent Publication No. 2006-76770, for example). The printer is typically connected to the option device with a connection cable connected to a connector provided in the option device.

SUMMARY OF THE INVENTION

In this connection, there is a demand for a printer having an option device connection circuit which has a simple configuration and is capable of securing the safety in an operation such as adding, removing, or replacing an option device.

One embodiment of the invention aims to provide a printer with an option device connection circuit which has a simple configuration and is capable of securing the safety of the option device and its connection.

An aspect of the invention is a printer that includes: a main apparatus; a device including a drive unit configured to operate by being supplied with electric power from the main apparatus; and a connection member to connect the main apparatus to the device. The main apparatus includes: a first power source provided to supply electric power to the device; and a first output port from which the electric power from the first power source is outputted to an outside of the main apparatus. The device includes: a first input port from which the electric power from the first power source is inputted to the device; a protection element with one end side connected to the first input port; a second output port connected to the other end side of the protection element, and provided to output electric power from the protection element to an outside of the device; and a second input port provided to the drive unit. The connection member includes: a first connecting path provided to connect the first output port to the first input port; and a second connecting path provided to connect the second output port to the second input port such that the output from the second output port is provided to the second input port therethrough.

With the above aspect, it is possible to simplify the configuration of the option device connection circuit while securing the safety.

BRIEF DESCRIPTION OF THE DRAWINGS

FIG. 7 is a flowchart illustrating an operation in the MFP according to the second embodiment.

DETAILED DESCRIPTION OF EMBODIMENTS

Figure 1:
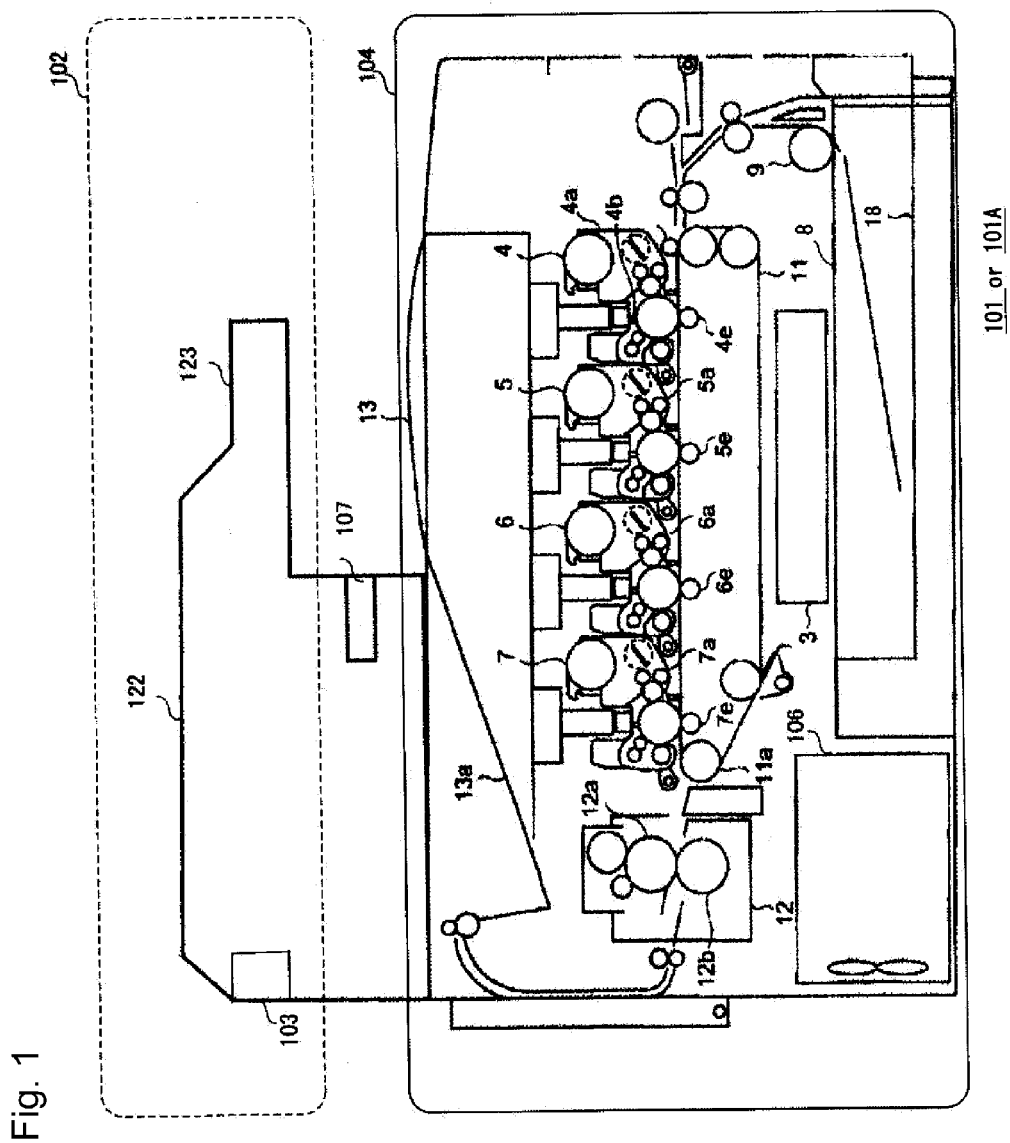
FIG. 1 is an inner configuration view illustrating a schematic inner configuration of an MFP according to a first embodiment.

Descriptions are provided hereinbelow for embodiments based on the drawings. In the respective drawings referenced herein, the same constituents are designated by the same reference numerals and duplicate explanation concerning the same constituents is omitted. All of the drawings are provided to illustrate the respective examples only.

(A) First Embodiment

Hereinafter, a first embodiment of a printer according to the invention is described in details with reference to the drawings.

The first embodiment exemplifies and describes the case where the invention is applied to a multi-function peripheral (hereinafter, referred to as MFP). Note that, the printer according to the invention is not limited to the MFP. The printer according to the invention can be widely applied to color printers or monochrome printers, facsimiles, and other devices which use an electrophotographic system.

(A-1) Configuration of First Embodiment
FIG. 1 is an inner configuration view illustrating a schematic inner configuration of MFP 101 according to the first embodiment.

In FIG. 1, MFP 101 according to the first embodiment is roughly divided into image reader unit 102, image record unit 104, electric-power supply unit 106, and stapler unit 107 which serves as an option device.

Image reader unit 102 is configured to read a document under the control of image reading controller 103 to create image information. Moreover, image reader unit 102 includes scanner unit 122 and operation panel 123.

Image reading controller 103 is configured to control, based on operation instruction information inputted by a user through operation panel 123, a scanner function by scanner unit 122, a facsimile function or an electronic mail function which uses the data read by scanner unit 122, or the like. Moreover, image reading controller 103 is configured to provide image information read by image reader unit 102 to image record unit 104 in order to execute a printing function.

Image record unit 104 is configured to print an image on a medium based on the image information from image reader unit 102.

Image record unit 104 includes cassette tray 8 serving as a medium container unit, hopping roller 9, print mechanisms 4 to 7, transfer rollers 4e to 7e serving as transfer devices, transfer belt 11, drive roller 11a, fuser 12 serving as a fixation device, cover 13, and stacker unit 13a.

Cassette tray 8 is configured to contain printing media 18. Hopping roller 9 is configured to pick up, one at a time, printing media 18 contained in cassette tray 8. In a printing operation, hopping roller 9 picks up each of printing media 18 from cassette tray 8, and sends out printing media 18 to a conveyance path.

Transfer belt 11 is configured to convey printing medium 18 fed from cassette tray 8 toward print mechanisms 4 to 7 in sequence. Transfer rollers 4e, 5e, 6e, and 7e connected to high-voltage power source 3 are on transfer belt 11. Transfer belt 11 is configured to covey printing medium 18 being held by image formation devices 4a, 5a, 6a, and 7a and transfer rollers 4e, 5e, 6e, and 7e. Transfer belt 11 is rotationally driven by drive roller 11a.

High-voltage power source 3 is a power source which supplies electric power to image formation devices 4a, 5a, 6a, and 7a, transfer rollers 4e, 5e, 6e, and 7e, and drive roller 11a. When the electric power is supplied from high-voltage power source 3 to transfer roller 4e, transfer roller 4e and drive roller 11a rotate and convey printing medium 18 held on transfer belt 11 to a predetermined position. High-voltage power source 3 is configured to include a high-voltage circuit which independently supplies high-voltage electric power to each of image formation devices 4a, 5a, 6a, and 7a and each of transfer rollers 4e, 5e, 6e, and 7e, and is controlled so as to apply a voltage in accordance with the color of each developer and a device position of each image formation device.

Four print mechanisms 4 to 7 include print mechanism 4 which uses a developer of yellow, print mechanism 5 which uses a developer of magenta, print mechanism 6 which uses a developer of cyan, and print mechanism 7 which uses a developer of black. The four print mechanisms 4 to 7 use the developers of different colors but include the same or a corresponding configuration. Accordingly, print mechanism 4 which uses a developer of yellow is representatively described herein.

Print mechanism 4 for a yellow color includes developer tank container 4f which stores a developer, image formation device 4a serving as a development device, exposure device 4b serving as an exposure device which exposes the surface of a photoconductive drum of image formation device 4a to light based on the image information from image reader unit 102, and transfer roller 4e serving as a transfer device which transfers a developer image formed on image formation device 4a onto printing medium 18.

Image formation device 4a is configured to transfer the developer from developer tank container 4f onto an electrostatic latent image, on the surface of the photoconductive drum, to which light is exposed by exposure device 4b, and accordingly to form a developer image. Image formation device 4a is configured to be detachable from and attachable to image record unit 104, and be replaceable. Moreover, developer tank container 4f is located above image formation device 4a, and developer tank container 4f is mounted to image formation device 4a in a detachable and attachable manner. Moreover, transfer belt 11 is rotatably disposed below image formation device 4a.

Fuser 12 is located downstream in the medium conveyance direction. Fuser 12 is configured to fix the developer image transferred on printing medium 18 onto printing medium 18. Fuser 18 includes heat roller 12a and pressure-contact roller 12b in order to transfer an image onto printing medium 18 by heating and applying pressure.

Printing medium 18 on which the image is fixed by fuser 12 is discharged by discharge rollers, and is placed on stacker unit 13a.

Cover 13 which can be opened and closed is provided on an upper portion of image record unit 104. Exposure devices 4b, 5b, 6b, and 7b mentioned above are attached on a bottom portion of cover 13.

Moreover, MFP 101 includes electric-power supply unit 106 that is a switching power source.

Electric-power supply unit 106 is configured to supply electric power to a heat source in fuser 12, in other words, to a halogen lamp in heat roller 12a and to provide the power supply to entire MFP 101.

Stapler unit 107 is configured to staple (bind) printed material. Stapler unit 107 is an example of an option device. As mentioned above, printed printing medium 18 is discharged from image record unit 104 to be placed on stacker unit 13a. Thereafter, multiple sheets of printed material are set on a staple position of stapler unit 107, and stapler unit 107 executes a staple operation when detecting the printed material as being set. As illustrated in FIG. 1, stapler unit 107 is provided at a support column portion between image reader unit 102 and image record unit 104. In other words, stapler unit 107 is separately provided from the conveyance path in image record unit 104. This enables a user to utilize a staple function by holding printed material with his/her hand and setting them to stapler unit 107.

Figure 2:
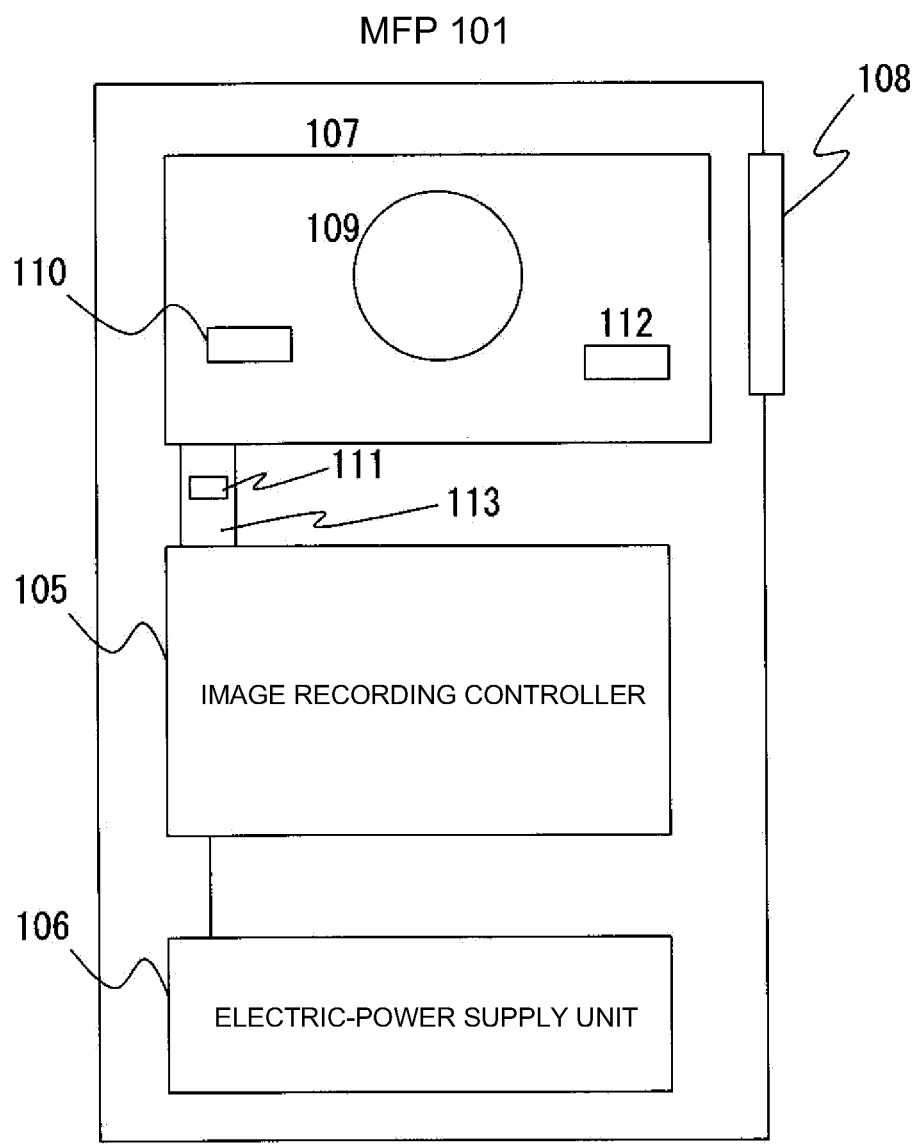
FIG. 2 is an explanation diagram for explaining a connection relation related to the power supply from the MFP to a stapler unit according to the first embodiment.

FIG. 2 is an explanation diagram explaining a connection relation related to the power supply from MFP 101 to stapler unit 107 according to the first embodiment.

As illustrated in FIG. 2, electric-power supply unit 106 is connected to image recording controller 105 which controls image record unit 104 in MFP 101. Stapler unit 107 is supplied with electric power via image recording controller 105.

Image recording controller 105 is supplied with electric power from electric-power supply unit 106 to control the components mentioned above which constitute image record unit 104. Meanwhile, image reading controller 103 in FIG. 1 is supplied with electric power from electric-power supply unit 106 via a different connection line, and thus the electric power necessary for controlling image reader unit 102 is supplied via image reading controller 103.

As mentioned in the foregoing, the electric power for image recording controller 105 is supplied from electric-power supply unit 106. Meanwhile, stapler unit 107 serving as an option device is connected to image recording controller 105 via connection cable 113 serving as a connection member, so that stapler unit 107 is supplied with electric power from electric-power supply unit 106.

As illustrated in FIG. 2, stapler unit 107 includes stapler cover 108, stapler motor 109, start switch 112, and overcurrent protection element 110. Moreover, connection cable 113 which connects stapler unit 107 to image recording controller 105 includes interlocking switch 111.

Figure 3:
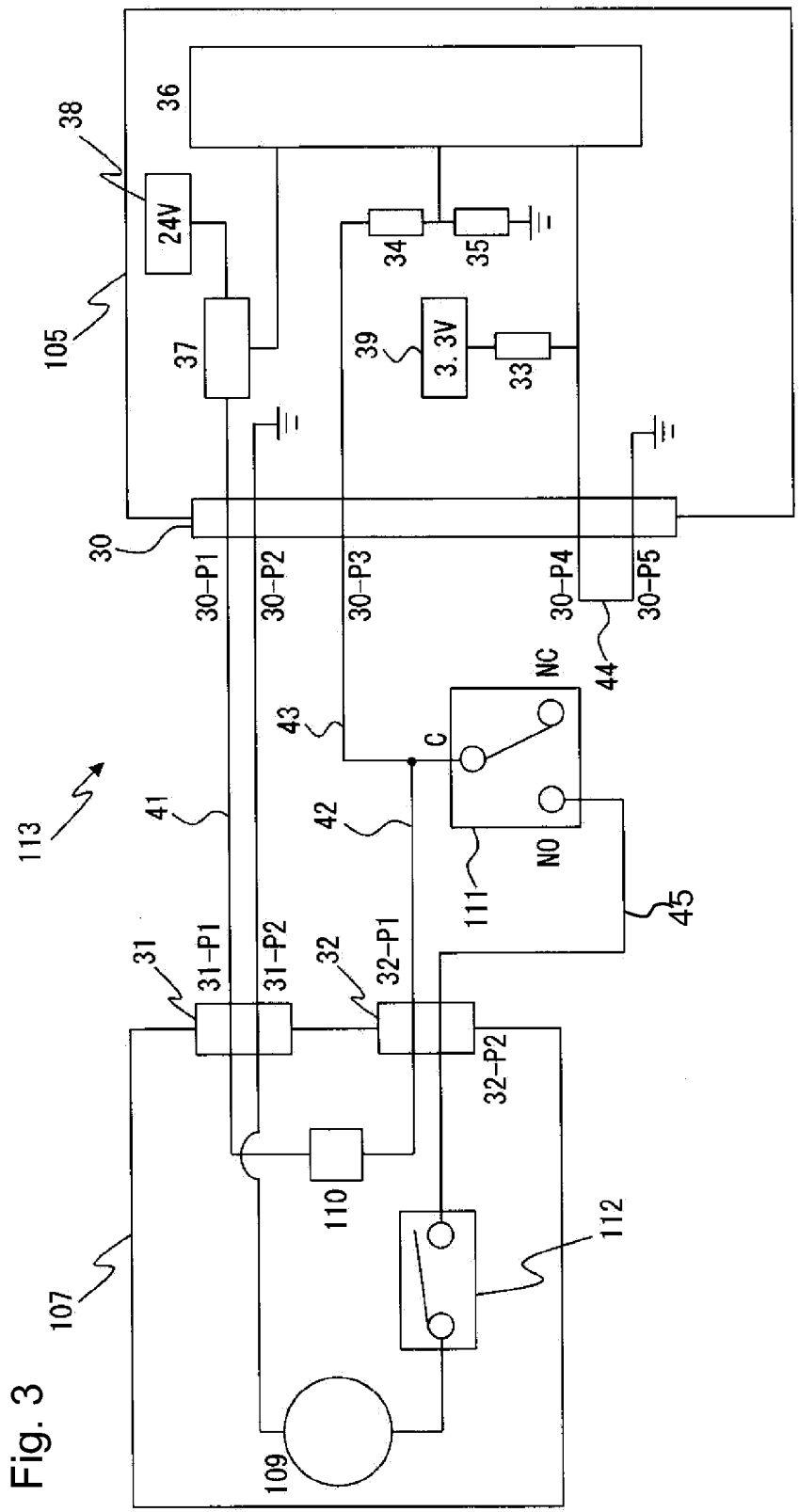
FIG. 3 is a block diagram illustrating a configuration of the stapler unit, an image recording controller, and a connection cable according to the first embodiment.

Electric power of DC 24 V from image recording controller 105 is supplied to stapler motor 109 through overcurrent protection element 110, interlocking switch 111, and start switch 112 (see FIG. 3). This rotates stapler motor 109 to cause stapler unit 107 to perform the staple operation.

Stapler motor 109 is a drive unit which is supplied with electric power to perform the staple operation.

Overcurrent protection element 110 is configured to increase a resistance value with the generation of heat when an overcurrent occurs in order to reduce the current value, thereby suppressing the overcurrent. A PTC thermistor, for example, can be applied as overcurrent protection element 110.

A load is applied to stapler motor 109 in the case where the number of sheets of staple target printed material is more than the number of sheets capable of being stapled, or the case where the printed material has a large thickness, for example. When stapler motor 109 cannot perform a rotation operation because a short circuit fault occurs, there is a possibility that a high current may flow into stapler unit 107 which could damage electric-power supply unit 106 that is an electric-power supply source. In order to keep the damage only in stapler unit 107 as an option device, overcurrent protection element 110 is provided to a power supply input port of stapler unit 107.

Stapler cover 108 is provided on a part of the exterior of MFP 101.

Stapler cover 108 aims to guide printed material when the user performs the staple operation and to guard the user so as to suppress such danger that a finger and the like are pinched at the staple operation. Accordingly, stapler cover 108 is operated in cooperation with interlocking switch 111. Interlocking switch 111 switches the connection in accordance with an open or closed state of stapler cover 108 in order to secure the safety, to turn on/off an operation of stapler unit 107.

In other words, under the condition where stapler cover 108 is open, interlocking switch 111 operates to cut off the supply of the electric power to stapler motor 109. Meanwhile, under the condition where stapler cover 108 is closed, interlocking switch 111 operates to allow the supply of the electric power to stapler motor 109.

Start switch 112 is a switch for starting the staple operation, and is provided inside stapler cover 108. Start switch 112 starts the staple operation when detecting printed material being set at the staple position.

As mentioned above, under the conditions where the electric power is supplied from electric-power supply unit 106, where overcurrent protection element 110 is in a normal state, and where interlocking switch 111 is in an ON state with stapler cover 108 closed, stapler unit 107 executes the staple operation by rotating stapler motor 109 in the normal state when start switch 112 is turned on after the user sets the printed material at the staple position.

Further, start switch 112 is configured to operate in cooperation with stapler motor 109, and continue an OFF state when stapler motor 109 rotates by a given amount to complete one staple operation even if start switch 112 is continuously in an ON state. Accordingly, stapler motor 109 does not continue the rotation after the staple operation is completed.

FIG. 3 is a block diagram illustrating a configuration of stapler unit 107, image recording controller 105, and connection cable 113 according to the first embodiment.

As mentioned above, stapler unit 107 and image recording controller 105 are connected via connection cable 113.

In FIG. 3, stapler unit 107 includes stapler motor 109 serving as a drive unit, power supply connector 31, interlocking switch connection connector 32, overcurrent protection element 110 serving as a protection element, and start switch 112.

Image recording controller 105 includes connector 30, resistors 33 to 35, CPU 36, electric-power cutoff unit 37, first power source 38, and second power source 39.

Connector 30 in image recording controller 105 is a five-pole connector. In FIG. 3, five pins of connector 30 are expressed as first pin 30-P1, second pin 30-P2, third pin 30-P3, fourth pin 30-P4, and fifth pin 30-P5 in the order from the top.

Moreover, connection cable 113 includes connecting path 41 which connects connector 30 in image recording controller 105 to power supply connector 31 in stapler unit 107, connecting path 42 which connects output pin 32-P1 of interlocking switch connection connector 32 to common pin C of interlocking switch 111, connecting path 43 which connects common pin C of interlocking switch 111 to connector 30 in image recording controller 105, connecting path 44 which connects fourth pin 30-P4 to fifth pin 30-P5 of connector 30, which are described later, connecting path 45 which connects a NO terminal of interlocking switch 111 to input pin 32-P2 of interlocking switch connection connector 32, and interlocking switch 111. Further, wires and the like in which a conductivity member is used, for example, can be applied to connecting path 41, connecting path 42, connecting path 43, connecting path 44, and connecting path 45.

Herein, the "main apparatus" described in the claims is an apparatus mounted on the printer and configured to supply electric power to a device to be connected thereto via a cable. In the embodiment, the "main apparatus" includes image recording controller 105. The "device" includes stapler unit 107 serving as an option device which can be connected to image recording controller 105 serving as the main apparatus.

Moreover, the "first connecting path", the "second connecting path", and the "third connecting path", which are described in the claims, respectively include: connecting path 41; connecting paths 42, 45, and 43 and interlocking switch 111; and connecting path 44. More specifically, the "second connecting path" includes connecting path 42 which connects output pin 32-P1, serving as a second output port, of connection connector 32 to common pin C of interlocking switch 111, connecting path 45 which connects the NO terminal of interlocking switch 111 to input pin 32-P2, serving as a second input port, of connection connector 32, interlocking switch 111, and connecting path 43 which connects common pin C of interlocking switch 111 to connector 30 in image recording controller 105.

In addition, the "first output port", the "second output port", and the "third output port", which are described in the claims, respectively include: first pin 30-P1 of connector 30; first pin 32-P1 of interlocking switch connection connector 32; and fourth pin 30-P4 of connector 30.

Moreover, the "first input port", the "second input port", the "third input port", and the "fourth input port", which are described in the claims, respectively include: first pin 31-P1 of power supply connector 31; second pin 32-P2 of interlocking switch connection connector 32; third pin 30-P3 of connector 30; and fifth pin 30-P5 of connector 30.

First power source 38 in image recording controller 105 serves as a power source to which electric power is supplied from electric-power supply unit 106, and is configured to supply an electric power of 24 V. Power source 38 is connected to electric-power cutoff unit 37, and electric-power cutoff unit 37 is connected to first pin 30-P1 of connector 30. Further, electric-power cutoff unit 37 such as a relay is connected to CPU 36, and under the control of CPU 36, electric-power cutoff unit 37 cuts off the electric power from first power source 38.

First pin 30-P1 of connector 30 is connected to electric-power cutoff unit 37, and is also connected to first pin 31-P1 of power supply connector 31 in stapler unit 107.

Second pin 30-P2 of connector 30 is connected to a ground as the power source reference of image recording controller 105, and is also connected to second pin 31-P2 of power supply connector 31 in stapler unit 107.

Third pin 30-P3 of connector 30 is connected to common pin C of interlocking switch 111, and to first pin 32-P1 of interlocking switch connection connector 32 in stapler unit 107. Moreover, third pin 30-P3 of connector 30 is connected to resistor 34 in image recording controller 105. A signal (abnormality detection signal) for detecting an abnormality of overcurrent protection element 110 is conducted through third pin 30-P3 of connector 30.

Herein, third pin 30-P3 of connector 30 is connected to first pin 32-P1 of interlocking switch connection connector 32, first pin 32-P1 being connected to overcurrent protection element 110, and remains at 24 V that is the power source voltage in stapler unit 107 when stapler unit 107 is in the normal state. A signal having a voltage value being divided into a logic voltage value detectable in CPU 36 by resistor 34 and resistor 35 which are connected to third pin 30-P3 of connector 30 is applied to CPU 36. For example, generation of heat due to a short circuit fault of stapler motor 109 or the like increases a resistance value of overcurrent protection element 110, so that overcurrent protection element 110 outputs the voltage of a smaller value. Accordingly, the voltage of a smaller value is also applied to CPU 36. This enables CPU 36 to detect an abnormality of stapler unit 107.

Fourth pin 30-P4 of connector 30 is connected to resistor 33 and CPU 36. Moreover, fourth pin 30-P4 of connector 30 is connected to fifth pin 30-P5 of connector 30 by connecting path 44 in a short circuit manner.

Inside image recording controller 105 to which fourth pin 30-P4 of connector 30 is connected, second power source 39, which supplies the voltage of 3.3 V that is the aforementioned logic voltage, is pull-up connected to resistor 33 to allow CPU 36 to detect the voltage at fourth pin 30-P4 of connector 30.

Fifth pin 30-P5 of connector 30 is connected to the ground as the power source reference inside image recording controller 105. Accordingly, when connection cable 113 is connected to image recording controller 105, fourth pin 30-P4 and fifth pin 30-P5 of connector 30 are shorted and have a ground potential (0V).

Herein, in image recording controller 105, second power source 39, which outputs 3.3 V that is the logic voltage value, is connected to CPU 36 via resistor 33. CPU 36 determines, based on a voltage value from second power source 39 or fourth pin 30-P4 of connector 30, whether connector 30 is mounted to image recording controller 105, or in other words, whether stapler unit 107 is mounted to MFP 101. In other words, if detecting that fourth pin 30-P4 of connector 30 has a voltage value of 0 V, CPU 36 determines that stapler unit 107 is mounted. Moreover, if CPU 36 detects the logic voltage value of 3.3 V, CPU 36 determines that stapler unit 107 is not mounted.

Note that, if stapler unit 107 is not mounted to MFP 101, application of the voltage of the logic voltage value to CPU 36 from second power source 39 enables CPU 36 to operate. On the other hand, if stapler unit 107 is mounted to MFP 101, application of the voltage of the logic voltage value to CPU 36 from third pin 30-P3 of connector 30 via resistors 34 and 35 enables CPU 36 to operate.

Interlocking switch 111 is a three-contact branch switch, and includes common terminal C, and the NO (Normally Open) terminal, and an NC (Normally Close) terminal.

Interlocking switch 111 is operated in cooperation with stapler cover 108 as mentioned above, and is connected to the NC terminal side when stapler cover 108 is in the open state, and is connected to the NO terminal side when stapler cover 108 is in the closed state. FIG. 3 exemplifies the case where interlocking switch 111 is connected to the NC terminal side.

First pin 31-P1 of power supply connector 31 in stapler unit 107 is connected to overcurrent protection element 110, and overcurrent protection element 110 is connected to first pin 32-P1 of interlocking switch connection connector 32.

Second pin 31-P2 of power supply connector 31 is connected to stapler motor 109, and is also connected to second pin 30-P2 of connector 30.

First pin 32-P1 of interlocking switch connection connector 32 is connected to overcurrent protection element 110. Moreover, first pin 32-P1 of interlocking switch connection connector 32 is connected to common terminal C of interlocking switch 111 and third pin 30-P3 of connector 30.

Second pin 32-P2 of interlocking switch connection connector 32 is connected to the NO terminal of interlocking switch 111, and is also connected to start switch 112.

In stapler unit 107, start switch 112 is connected to second pin 32-P2 of interlocking switch connection connector 32, and is also connected to stapler motor 109.

Stapler motor 109 is connected to start switch 112, is also connected to second pin 31-P2 of power supply connector 31, and is wired to the ground inside image recording controller 105 via second pin 30-P2 of connector 30.

In this manner, in stapler unit 107, the electric power of DC 24 V is supplied from image recording controller 105, and start switch 112 is connected to interlocking switch 111 in series through overcurrent protection element 110 and thereafter is connected to stapler motor 109.

(A-2) Operation in First Embodiment

Figure 4:
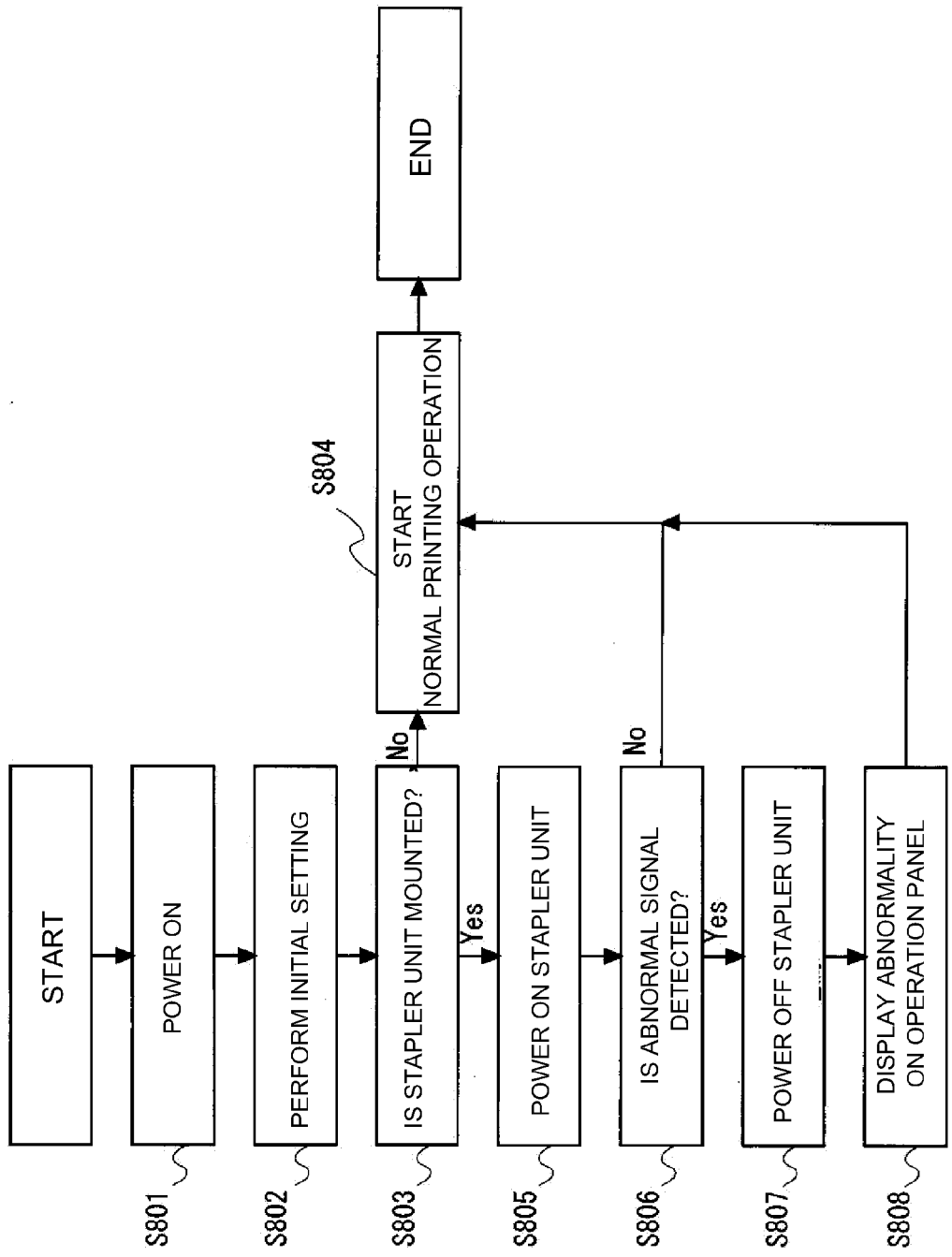
FIG. 4 is a flowchart illustrating an operation in the MFP according to the first embodiment.

FIG. 4 is a flowchart illustrating an operation in MFP 101 according to the first embodiment.

Firstly, when MFP 101 is powered on (S801), electric-power supply unit 106 starts the supply of electric power to image recording controller 105 to start up MFP 101.

Image recording controller 105 supplied with the electric power performs a self-diagnosis on conditions of MFP 101 to check whether an abnormality is present, and performs an initial setting (S802).

Herein, at this stage, CPU 36 performs a control of turning electric-power cutoff unit 37 into a cut-off state. Accordingly, electric power is not supplied to power supply connector 31 in stapler unit 107.

After the initial setting at S802, the process proceeds to S803, and CPU 36 in image recording controller 105 checks whether stapler unit 107 is mounted.

In other words, if stapler unit 107 is mounted via connection cable 113 (connector 30 is mounted), fourth pin 30-P4 of connector 30 in image recording controller 105 is connected to fifth pin 30-P5 of connector 30 in a short circuit manner. Inside image recording controller 105 to which fourth pin 30-P4 of connector 30 is connected, 3.3 V that is the aforementioned logic voltage value is pull-up connected to resistor 33, and CPU 36 checks whether stapler unit 107 is mounted by detecting the voltage value at fourth pin 30-P4 of connector 30.

If connector 30 is not mounted, fourth pin 30-P4 of connector 30 has a voltage of 3.3 V that is the logic voltage decided at pull-up resistor 33. Accordingly, when detecting 3.3 V that is the logic voltage, CPU 36 determines that stapler unit 107 is not mounted. In this case, the process proceeds to S804 because an abnormality is not required to be detected, and CPU 36 starts a normal printing operation.

On the other hand, if connector 30 is mounted, fifth pin 30-P5 of connector 30 is connected to the ground that is the power source reference inside image recording controller 105, so that connection cable 113 is connected to image recording controller 105 to cause fourth pin 30-P4 and fifth pin 30-P5 of connector 30 to be shorted and have the ground potential (0 V). Accordingly, when detecting 0 V, CPU 36 determines that stapler unit 107 is mounted.

In this case, the process proceeds to S805 where, in order to make stapler unit 107 available, CPU 36 controls electric-power cutoff unit 37 to be in an energized state, and supplies the electric power of 24 V to stapler unit 107 to power on stapler unit 107.

Thereafter, CPU 36 in image recording controller 105 determines the presence or absence of an abnormal signal from stapler unit 107 (S806).

When the supply of the electric power to stapler unit 107 is started, the electric power of 24 V is supplied from first pin 30-P1 of connector 30 to first pin 31-P1 of power supply connector 31 of stapler unit 107.

The supplied electric power of 24 V is passed through overcurrent protection element 110 to be supplied to common terminal C of interlocking switch 111 via connector 32, and the voltage divided by resistor 34 and resistor 35 is supplied to CPU 36.

Herein, in a state where the supplied electric power of 24 V to stapler unit 107 has no abnormality and no overcurrent occurs, overcurrent protection element 110 performs no protection operation. Accordingly, overcurrent protection element 110 has a sufficiently low resistance value, and the voltage of 24 V is supplied to third pin 30-P3 of connector 30, which is not substantially different from that of first pin 30-P1 of connector 30.

As a result, CPU 36 detects that 3.3 V is about the logic voltage in which the voltage of 24 V is divided by resistor 34 and resistor 35, so that CPU 36 determines that no abnormality is present.

However, in a state where stapler cover 108 is in a closed state, interlocking switch 111 is connected to the NO terminal, and an abnormality is present in stapler motor 109 or start switch 112, and overcurrent protection element 110 becomes high-resistant because the temperature increases due to the overcurrent.

When the overcurrent occurs, a short circuit occurs in a path in the downstream of overcurrent protection element 110 before stapler motor 109. Accordingly, the voltage of 24 V is not supplied to third pin 30-P3 of connector 30. The 24 V voltage is divided by resistor 34 and resistor 35 inside image recording controller 105 and a low value of about 0 V is inputted into CPU 36. This enables CPU 36 to detect an abnormality of stapler unit 107.

If CPU 36 detects an abnormality, the process immediately proceeds to S807 where CPU 36 performs the control of turning electric-power cutoff unit 37 into a cut-off state to cut off the supply of the electric power to stapler unit 107, thereby powering off stapler unit 107.

In this manner, the process proceeds to S808 after the safety of stapler unit 107 is secured. At S808, the abnormality being present in stapler unit 107 is outputted to (displayed on) operation panel 123 in order to notify a user that a repair is required. Note that, an output method of notifying the user that a repair is required is not limited to the display screen on the operation panel 123, but may include the method of outputting a buzzer sound, or, for example, performing the lighting or the flashing of a lamp such as an LED lamp.

When a printing operation in image record unit 104 becomes impossible only because a stapler operation in stapler unit 107 serving as an option device is unavailable, this largely damages the convenience of the user. Accordingly, stapler cover 108 is opened and interlocking switch 111 is connected to the NC terminal side (non-energized side) to cut off the overcurrent to stapler motor 109. In this manner, the normal printing operation is made to be available (S804). Further, until the repair is performed and the abnormality is recovered, an output for bringing the user's attention to the fact that an abnormal state detection can be temporarily released may be performed.

Moreover, in the operation in the embodiment mentioned above, the example has been explained in which after an abnormality is detected, electric-power cutoff unit 37 is controlled to be in the cutoff state and the supply of the electric power is cut off. However, an abnormality detection result is stored in a memory inside image recording controller 105 as an abnormality information, and the completion of the repair of abnormal stapler unit 107 can be inputted with operation panel 123. Further, CPU 36 may control electric-power cutoff unit 37 to continue the cutoff state such that after stapler unit 107 being mounted is checked after MFP 101 is powered on, stapler unit 107 is not powered on before the abnormality detection information is reset. Also with this modification embodiment, the safety can be secured.

(A-1) Effect of First Embodiment

As in the foregoing, with the first embodiment, without providing a dedicated circuit which detects an abnormality in the option device to which the overcurrent protection element is mounted, the MFP can detect that a safety device in the option device works, and can precisely notify the user of the abnormality of the option device, with a simple circuit.

Moreover, integrating the function to supply electric power to the stapler unit, the function of the interlocking switch which operates in cooperation with the opening and the closing of the stapler cover, and the function to detect the safety of the overcurrent protection element allows the simplified configuration without mounting the dedicated circuit to the option device.

(A) Second Embodiment

Next, a second embodiment of a printer according to the invention is described in detail with reference to the drawings.

A case where the invention is applied to an MFP is exemplified and described also in the second embodiment similar to the first embodiment.

(A) Configuration in Second Embodiment

The MFP according to the second embodiment can be also an apparatus the same or corresponding to MFP 101 according to the first embodiment. Accordingly, an explanation is made using FIG. 1 also in the second embodiment. Moreover, the explanation is made to the MFP referred to as MFP 101A in the second embodiment.

Hereinafter, differences in configuration from the configuration explained in the first embodiment are mainly explained.

Figure 5:
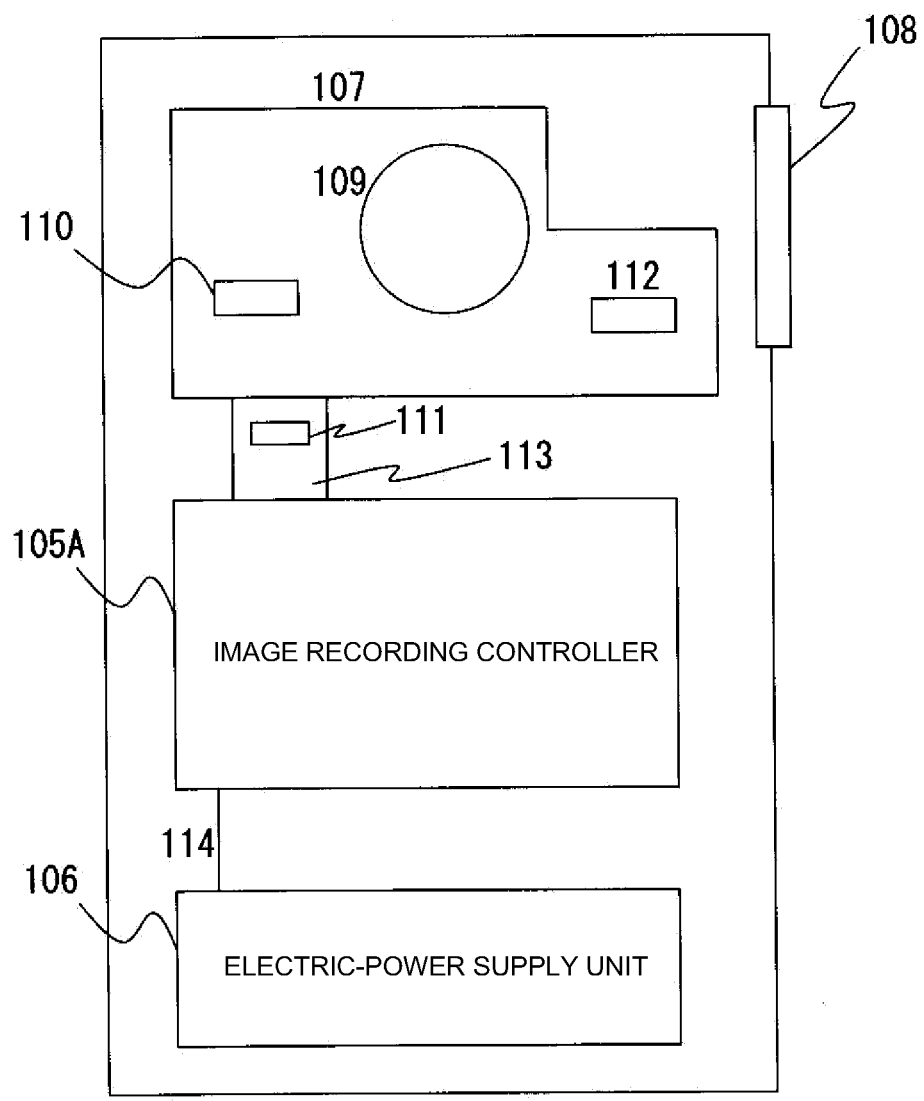
FIG. 5 is an explanation diagram for explaining a connection relation related to the power supply from an MFP to the stapler unit according to a second embodiment.

FIG. 5 is an explanation diagram explaining a connection relation related to the power supply from MFP 101A to stapler unit 107 according to the second embodiment.

As illustrated in FIG. 5, electric-power supply unit 106 is connected to image recording controller 105A which controls image record unit 104 in MFP 101A, and stapler unit 107 is supplied with electric power via image recording controller 105A.

Figure 6:
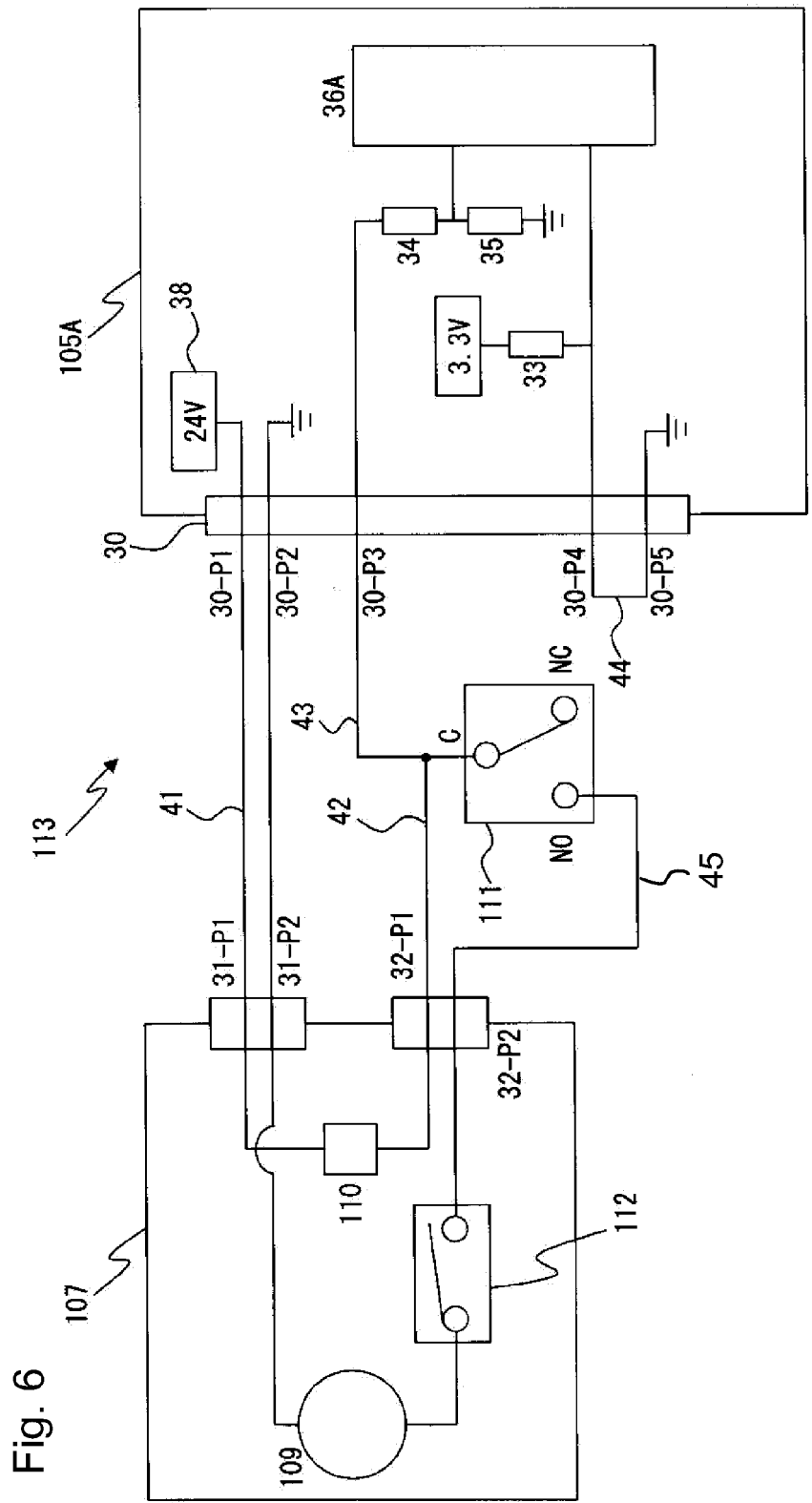
FIG. 6 is a block diagram illustrating a configuration of the stapler unit, an image recording controller, and the connection cable according to the second embodiment.

FIG. 6 is a block diagram illustrating a configuration of stapler unit 107, image recording controller 105A, and connection cable 113 according to the second embodiment.

In FIG. 6, stapler unit 107 includes stapler motor 109, power supply connector 31, interlocking switch connection connector 32, overcurrent protection element 110, and start switch 112.

As mentioned above, stapler unit 107 and image recording controller 105A are connected via connection cable 113.

Stapler unit 107 includes stapler motor 109, power supply connector 31, interlocking switch connection connector 32, overcurrent protection element 110, and start switch 112.

Image recording controller 105A includes connector 30, resistors 33 to 35, CPU 36A, electric-power cutoff unit 37, first power source 38, and second power source 39.

Connection cable 113 includes connecting path 41 which connects connector 30 in image recording controller 105A to power supply connector 31 in stapler unit 107, connecting path 42 which connects interlocking switch connection connector 32 to interlocking switch 111, connecting path 43 which connects interlocking switch 111 to connector 30 in image recording controller 105, and interlocking switch 111.

The differences from the first embodiment are as follows: electric-power cutoff unit 37 is not present in image recording controller 105A according to the second embodiment; and CPU 36A according to the second embodiment inside image recording controller 105A has a power saving mode, CPU 36A can notify electric-power supply unit 106 of the power saving mode, and the wiring is made such that electric-power supply unit 106 having received a shift instruction to the power saving mode cuts off the power supply of 24 V in image recording controller 105 to allow the electric power to stapler unit 107 to be cut off.

Firstly, in FIG. 5, the electric power used in image recording controller 105A is supplied thereto from electric-power supply unit 106 with a 24 V supply line and a 3.3 V supply line which are provided in connection cable 114.

Stapler unit 107 serving as an option device is connected to image recording controller 105A via connection cable 113, and stapler unit 107 is supplied with the electric power from electric-power supply unit 106 through the 24 V supply line in connection cable 114 and image recording controller 105A.

Image recording controller 105A is supplied with multiple kinds of electric power from electric-power supply unit 106.

The first is an electric power of 24 V used for an actuator such as a motor in image record unit 104 supplied from electric-power supply unit 106 via the 24 V supply line provided in connection cable 114, and the electric power is supplied to stapler unit 107 via image recording controller 105A.

As for the electric power of 24 V, when MFP 101A is shifted to the power saving mode that is a standby state, a control signal inside connection cable 114 allows an instruction from CPU 36A to be notified to electric-power supply unit 106. Reception of the above mentioned control signal enables electric-power supply unit 106 to turn off the supply of the electric power of 24 V.

CPU 36A which controls the entire image recording controller 105A, controls the control to shift to the power saving mode at the time of the standby. When CPU 36A determines that a shift to the power saving mode is possible, the wiring is made such that CPU 36A can instruct electric-power supply unit 106 in supply cutoff of the electric power of 24 V.

The second is an electric power of 3.3 V that is the logic voltage for CPU 36A which controls the entire image recording controller 105A. Image recording controller 105A is supplied with the electric power of 3.3 V from electric-power supply unit 106 via the 3.3 V supply line provided in connection cable 114.

The electric power of 3.3 V is not cut off, even in the power saving mode, and the supply of the electric power is continued until the supply of the electric power from the commercial power source to electric-power supply unit 106 is cut off.

Accordingly, in the standby state of MFP 101A, although consumption of the electric power of 24 V is cut off, the supply of 3.3 V that is the logic voltage is continued. This enables image recording controller 105A to receive a printing direction, and the supply of the electric power of 24 V to image recording controller 105A to be restarted such that image recording controller 105A transmits the instruction from CPU 36A to electric-power supply unit 106 when receiving the printing direction.

Stapler unit 107 includes stapler cover 108, stapler motor 109, start switch 112, and overcurrent protection element 110. A PTC thermistor or the like can be used as overcurrent protection element 110 similar to the first embodiment.

Stapler unit 107 is supplied with the electric power of 24 V from image recording controller 105A, and performs a staple operation such that start switch 112 is connected in series to interlocking switch 111 through overcurrent protection element 110 and thereafter is connected to stapler motor 109 to rotate stapler motor 109.

As for overcurrent protection element 110, when a motor, for example, cannot perform a rotation operation because a short circuit fault occurs, there is a possibility that a high current may flow to damage electric-power supply unit 106 that is an electric-power supply source. In order to keep the damage only in stapler unit 107 that is the option device, overcurrent protection element 110 is provided to a power supply input port of stapler unit 107.

Overcurrent protection element 110 generates heat when the overcurrent occurs, and operates to reduce the current because a resistance value increases with the generation of heat accordingly to prevent the overcurrent.

Stapler cover 108 is operated in cooperation with interlocking switch 111, similar to the first embodiment. When stapler cover 108 is in the open state, interlocking switch 111 operates to cut off the supply of the electric power to stapler motor 109.

Start switch 112 is provided inward of stapler cover 108, and is a switch for starting a staple operation by detecting that printed materials are set in the staple position.

Accordingly, in stapler unit 107 which is supplied with the electric power from electric-power supply unit 106, when overcurrent protection element 110 is in a normal state, stapler cover 108 is in a closed state so that interlocking switch 111 is in an ON state, and printed materials for which the staple is utilized are set to turn on (conduct) start switch 112, stapler motor 109 in the normal state rotates to execute the staple operation.

Further, start switch 112 is configured to operate in cooperation with stapler motor 109, and continue an OFF state when stapler motor 109 rotates by a given amount to complete one staple operation even if start switch 112 is continuously in an ON state. Accordingly, stapler motor 109 does not continue the rotation after the staple operation is completed.

Connection cable 113 is one three-contact branch switch that is configured to connect the three connectors which connect stapler unit 107 to image recording controller 105A to interlocking switch 111.

Connector 30 which is connected to image recording controller 105A is a five-pole connector.

First pin 30-P1 is a pin for supplying electric power of 24 V from image recording controller 105A to stapler unit 107. First pin 30-P1 of connector 30 is connected to first pin 31-P1 of power supply connector 31 in stapler unit 107. First pin 31-P1 of power supply connector 31 in stapler unit 107 is connected to overcurrent protection element 110, and thereafter is connected to first pin 32-P1 of interlocking switch connection connector 32. Moreover, inside image recording controller 105A in which first pin 30-P1 of connector 30 is connected, 24 V supplied from electric-power supply unit 106 is connected.

Second pin 30-P2 of connector 30 is connected to a ground that is the power source reference in image recording controller 105A.

Third pin 30-P3 of connector 30 is inputted with a signal for detecting an abnormality of overcurrent protection element 110, and is connected to common pin C of interlocking switch 111 and to first pin 32-P1 of interlocking switch connection connector 32 in stapler unit 107.

Third pin 30-P3 of connector 30 is connected to overcurrent protection element 110 via first pin 32-P1 of connector

32. However, in a normal state where no overcurrent occurs, overcurrent protection element 110 has an extremely low resistance value, so that 24 V, being the power source voltage in the stapler, is inputted into image recording controller 105A at third pin 30-P3 of connector 30.

Accordingly, a signal of which voltage is divided by resistor 34 and resistor 35 inside image recording controller 105A into 3.3 V that is the logic voltage detectable by CPU 36A is inputted into CPU 36A. When overcurrent protection element 110 has a low resistance value, a signal of which voltage is divided by resistor 34 and resistor 35 from 24 V to 3.3 V that is the logic voltage is inputted. However, in an abnormal state where the overcurrent occurs, overcurrent protection element 110 becomes a high-resistance, so that although the voltage divided in overcurrent protection element 110, and resistor 34 and resistor 35 is detected, the resistance value in overcurrent protection element 110 is sufficiently larger. Accordingly, CPU 36A detects the voltage having a value of almost 0 V.

This enables CPU 36A to detect an abnormality based on a signal inputted of which voltage is divided.

Fourth pin 30-P4 of connector 30 is connected to fifth pin 30-P5 of connector 30 by connecting path 44 in a short circuit manner.

Inside image recording controller 105A to which fourth pin 30-P4 of connector 30 is connected, 3.3 V as the aforementioned logic voltage is pull-up connected to resistor 33 to allow CPU 36A to detect the voltage at fourth pin 30-P4 of connector 30.

Fifth pin 30-P5 of connector 30 is connected to the ground as the power source reference inside image recording controller 105A. Thus, when connection cable 113 is connected to image recording controller 105A, fourth pin 30-P4 and fifth pin 30-P5 of connector 30 are shorted, and resultantly have a ground potential (0 V).

If connector 30 is mounted, in other words, stapler unit 107 is mounted to MFP 101A, stapler unit 107 is connected so as to allow CPU 36A to detect the voltage at fourth pin 30-P4 of connector 30, and to determine that stapler unit 107 is mounted if detecting 0 V; whereas, to determine that stapler unit 107 is not mounted if detecting 3.3 V that is the logic voltage.

Second pin 32-P2 of interlocking switch connection connector 32 provided in stapler unit 107 is connected to the NO terminal of interlocking switch 111. Moreover, the NC terminal of interlocking switch 111 is connected only as an open pin.

Second pin 32-P2 of interlocking switch connection connector 32 is connected to start switch 112, and thereafter is connected to stapler motor 109, inside stapler unit 107.

Stapler motor 109 is wired so as to be connected to second pin 31-P2 of connector 31 and be connected to a ground inside image recording controller 105A.

(B-2) Operation in Second Embodiment

FIG. 7 is a flowchart illustrating an operation in MFP 101A according to the second embodiment.

Firstly, at S901, when MFP 101A is powered on, electric-power supply unit 106 starts supplying electric power to image recording controller 105A via connection cable 114 to start up MFP 101A.

In the second embodiment, electric-power cutoff unit 37 according to the first embodiment in FIG. 3 is not present. Accordingly, at the stage of S901, the electric power of 24 V is supplied from first pin 30-P1 of connector 30 to first pin 31-P1 of power supply connector 31 in stapler unit 107.

The supplied electric power of 24 V is passed through overcurrent protection element 110 to be supplied to common terminal C of interlocking switch 111 via connector 32, and the voltage divided by resistor 34 and resistor 35 is supplied to CPU 36A.

Next, at S902, image recording controller 105A supplied with the electric power performs a self-diagnosis for a state of MFP 101A to check whether an abnormality is present, and performs an initial setting of the entire MFP 101A.

Herein, in a state where no abnormality is present in the supplied electric power and no overcurrent occurs, overcurrent protection element 110 performs no protection operation, and CPU 36A detects 3.3 V, that is the logic voltage in which 24 V of the power source voltage is divided by resistor 34 and resistor 35, to determine that no abnormality is present.

At S903, CPU 36A checks whether stapler unit 107 is mounted.

Fourth pin 30-P4 of connector 30 is connected to fifth pin 30-P5 of connector 30 in such a manner that a short circuit occurs if stapler unit 107 is mounted.

Inside image recording controller 105A to which fourth pin 30-P4 of connector 30 is connected, 3.3 V that is the aforementioned logic voltage is pull-up connected to resistor 33 to allow CPU 36A to detect the voltage at fourth pin 30-P4 of connector 30.

Fifth pin 30-P5 of connector 30 is connected to the ground as the power source reference inside image recording controller 105A. Thus, when connection cable 113 is connected to image recording controller 105A, fourth pin 30-P4 and fifth pin 30-P5 of connector 30 are shorted, and resultantly have a ground potential (0 V).

If connector 30 is mounted, in other words, stapler unit 107 is mounted to MFP 101A, CPU 36A detects the voltage at fourth pin 30-P4 of connector 30, and if detecting 0 V, CPU 36A determines that stapler unit 107 is mounted.

If stapler unit 107 is not mounted, when CPU 36A detects 3.3 V that is the logic voltage decided at pull-up resistor 34 as the voltage at fourth pin 30-P4 of connector 30, CPU 36A determines that stapler unit 107 is not mounted.

The reason why the processing at S903 is performed immediately after the initial setting is because if connection cable 113 is not connected, in other words, no stapler unit 107 is mounted, then no third pin 30-P3 of connector 30 is connected either. This is because no voltage is generated in resistor 34 and resistor 35, so that CPU 36A cannot distinguish the state of overcurrent protection element 110 from the high-resistant state and thus detects an abnormal state.

If no stapler unit 107 is mounted, an abnormality detection is not required. Accordingly, the process proceeds to S904, and CPU 36A controls so as to start a normal printing operation.

However, if it is determined that stapler unit 107 is mounted, the process proceeds to S905. At S905, CPU 36A determines whether stapler unit 107 generates the overcurrent and a protection operation by overcurrent protection element 110 is performed by detecting 3.3 V that is the logic voltage divided by resistor 34 and resistor 35.

If an abnormality is present, the overcurrent causes protection element 110, that is a PTC thermistor, to have an increased temperature and a high-resistance and to operate so as to cut off the current. Accordingly, a short circuit occurs in a path in the downstream of overcurrent protection element 110 before stapler motor 109. The voltage of 24 V is not supplied to third pin 30-P3 of connector 30, the voltage being divided by resistor 34 and resistor 35 inside image recording controller 105A and, having a low value of about 0 V, is inputted into CPU 36A. Accordingly, CPU 36A detects an abnormality of stapler unit 107.

If CPU 36A detects an abnormality, the process immediately proceeds to S906, and CPU 36A checks whether a printing job is accepted in order to continue the printing operation without any change.

If an abnormality is detected after the printing job is accepted, image recording controller 105A completes the accepted printing job without accepting the subsequent printing jobs, and outputs (displays) stapler unit 107 being abnormal to operation panel 123, in order to notify the user that image recording controller 105A is required to be repaired.

If a printing job is not accepted, the process is immediately shifted to S908, and image recording controller 105A displays stapler unit 107 as being abnormal on operation panel 123 to notify the user that the repair is required.

Thereafter, image recording controller 105A causes operation panel 123 to display stapler unit 107 as being abnormal for a predetermined period of time (for example, 30 seconds). Thereafter the process proceeds to S909, where the electric-power supply unit 106 is instructed to cutoff the electric power of 24 V such that CPU 36A in image recording controller 105A is shifted to the power saving mode.

As a result, the electric power of 24 V supplied to stapler unit 107 is cut off due to the shift to the power saving mode, so that the overcurrent generated in stapler unit 107 is also released, thereby securing the safety.

Thereafter, if the power saving mode is continued, an original printing function of MFP 101A cannot be utilized. Accordingly, a restart available state may be made by only pressing a power saving recover button or the like provided on operation panel 123. This is because if the user transmits a printing request to MFP 101A through a LAN or by a USB signal, for example, after accepting the printing job and completing the printing operation, MFP 101A is again shifted to the power saving mode. In that case, there is a high possibility that the user cannot be aware of the warning of stapler unit 107 being abnormal, so that the user is required to stand up in front of user MFP 101A, and is prompted to check the display of the abnormality warning screen on operation panel 123.

After CPU 36A is shifted to the power saving mode, if the user presses a power supply button, processing is started again from S901.

If the repair of stapler unit 107 is completed, the process proceeds to S904 without detecting an abnormality, and a normal printing operation is performed. However, if CPU 36A is recovered from the power saving mode before the repair of stapler unit 107 is completed, CPU 36A detects an abnormality in order to again check an abnormality detection signal, so that after the abnormality is displayed on operation panel 123 at S908, MFP 101A is shifted to the power saving mode at S909. If the printing operation becomes impossible only because the stapler operation is unavailable, this largely damages the convenience.

Accordingly, before the repair is performed, stapler cover 108 may be opened simultaneously with the abnormality warning of stapler unit 107 being displayed immediately before CPU 36A is shifted to the power saving mode to simultaneously display that the abnormal state detection can be temporarily released before the repair is performed.

This is because stapler cover 108 is opened not only to prompt the user to check the abnormality, but also to aim to open interlocking switch 111 in response to the overcurrent because the overcurrent generated in an abnormal state occurs due to the abnormality of stapler motor 109 or start switch 112.

Interlocking switch 111 is switched so as to be connected to the NC terminal side to cut off the electric power to stapler motor 109 and start switch 112, so that the overcurrent state to overcurrent protection element 110 is released and overcurrent protection element 110 is cooled. Accordingly, overcurrent protection element 110 ends the protection operation.

The normal power supply of 24 V is applied to resistor 34 and resistor 35 inside image recording controller 105A, so that CPU 36A determines that no abnormality is present. As a result, the original printing function of MFP 101A becomes available.

(B-3) Effect of Second Embodiment

As in the foregoing, in addition to the effect of the first embodiment, the second embodiment achieves the configuration capable of cutting off the power supply of the stapler unit in the power saving mode, without needing the electric-power cutoff unit, which is usable to cut off the overcurrent only at the time of a fault.

As the effect similar to the first embodiment, when a non-linear impedance element (poly-switch or the like), which is provided for protecting the stapler motor against a fault and has a positive temperature coefficient, starts a protection operation, the configuration of the second embodiment secures the safety by notifying a user of the fault in the stapler unit, and thereafter shifting to the power saving mode to safely cut off the power supply and to notify the user that the danger should be avoided.

Moreover, the stapler cover is opened to open the interlocking switch. This allows the original printing function of the MFP to be continuously available.

Similar to the effect of first embodiment, integrating the function to supply electric power to the stapler unit, the function of the interlocking switch which operates in cooperation with the opening and the closing of the stapler cover, and the function to detect the safety of the overcurrent protection element allows the simplified configuration without the dedicated circuit mounted in the option device.

(C) Other Embodiments

Although various modification embodiments are mentioned in the embodiments mentioned above, the invention can be applied to the following modification embodiments.

(C-1)

In the embodiments mentioned above, the case where an option device is the stapler unit is exemplified. However, as for the option device, devices can be widely applied as the option device as long as an overcurrent protection element and a motor are provided. For example, as for the option device, option devices such as cutters or electric punches, which are each provided with a current protection element and a motor, can be widely applied.

(C-2)

In the embodiments mentioned above, although the case where the stapler unit serving as the option device is provided with one motor (stapler motor) is exemplified, the stapler unit may be provided with multiple motors. Moreover, multiple option devices are mounted on the printer main body, and the option devices may be connected to one another using connection cable 113.

(C-3)

In the embodiments mentioned above, the case where the CPU determines whether an abnormality is present based on the electric power from third pin 30-P3 of connector 30 is exemplified. When the CPU determines whether an abnormality is present, the CPU may make the determination based on the electric power from third pin 30-P3 and the electric power from fourth pin 30-P4, of connector 30.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A printer comprising:
a main apparatus comprising an image formation device that forms a developer image onto an image carrier, a transfer device that transfers the developer image onto a print medium, a fixing device that fixes the developer image on the print medium, and a controller performing operations to control the operation of the printer;
a device including a drive unit that operates by being supplied with electric power from the main apparatus; and
a connection member to connect the main apparatus to the device, wherein
the main apparatus includes:
 a first power source provided to supply electric power to the device; and
 a first output port from which the electric power from the first power source is outputted to an outside of the main apparatus,
the device includes:
 a first input port from which the electric power from the first power source is inputted to the device;
 a protection element with a first end side connected to the first input port;
 a second output port connected to a second end side of the protection element, and provided to output electric power from the protection element to an outside of the device; and
 a second input port connected to the drive unit, and
the connection member includes:
 a first connecting path provided to connect the first output port to the first input port; and
 a second connecting path provided to connect the second output port to the second input port such that the output from the second output port is provided to the second input port therethrough.

2. The printer according to claim 1, wherein
the main apparatus includes a third input port
the second connecting path of the connection member connects the second output port of the device to the third input port of the main apparatus, and
the controller performs operations to control the supply of the electric power by the first power source in accordance with a signal inputted into the third input port.

3. The printer according to claim 2, wherein
the main apparatus includes an electric-power cutoff unit that cuts off the electric power by the first power source, and
the controller in the main apparatus controls the electric-power cutoff unit in accordance with the signal inputted into the third input port.

4. The printer according to claim 2, wherein
the controller in the main apparatus instructs a shift of an electric-power mode in accordance with the signal inputted into the third input port.

5. The printer according to claim 1, wherein the connection member is a connection cable.

6. The printer according to claim 1, wherein the second connecting path includes a safety switch provided to switch the connection between the second output port and the second input port based on an operating state of the device.

7. A printer comprising:
a main apparatus, the main apparatus including an image formation device that transfers developer from a developer container onto an electrostatic latent image, a developer image formation unit that forms a developer image onto a surface of a photoconductive drum by exposing the electrostatic latent image on the photoconductive drum to light, and a fixing unit that fixes the developer image onto a print medium, and a controller performing operations to control the operation of the printer;
a device including a drive unit that operates by being supplied with electric power from the main apparatus; and
a connection member to connect the main apparatus to the device, wherein
the main apparatus includes:
 a first power source provided to supply electric power to the device; and
 a first output port from which the electric power from the first power source is outputted to an outside of the main apparatus,
the device includes:
 a first input port from which the electric power from the first power source is inputted to the device;
 a protection element with a first end side connected to the first input port;
 a second output port connected to a second end side of the protection element, and provided to output electric power from the protection element to an outside of the device; and
 a second input port connected to the drive unit, and
the connection member includes:
 a first connecting path provided to connect the first output port to the first input port; and
 a second connecting path provided to connect the second output port to the second input port such that the output from the second output port is provided to the second input port therethrough,
wherein
the main apparatus includes:
 a third input port,
 wherein the controller controls a supply of the electric power by the first power source,
 the second connecting path of the connection member connects the second output port of the device to the third input port of the main apparatus, and
 the controller controls the supply of the electric power by the first power source in accordance with a signal inputted into the third input port,
 a second power source;
 a third output port from which electric power by the second power source is outputted to the outside of the main apparatus; and
 a fourth input port connected to a ground,
the connection member includes a third connecting path provided to connect the third output port to the fourth input port, and
the controller determines whether the connection member is connected or not based on a detection result as to whether the output of the electric power by the second power source is present or not.

8. A printer system comprising:
a printer that includes a controller that performs operations to control the operation of the printer;
an optional device capable of being optionally connected to the printer and including a drive unit that operates by being supplied with electric power from the printer; and a connection cable to connect the printer to the optional device, wherein the printer includes:
- a first power source provided to supply electric power to the optional device; and
- a first output port from which the electric power from the first power source is outputted to an outside of the printer, the optional device includes:
- a first input port from which the electric power from the first power source is inputted to the optional device via the connection cable;
- a protection element with a first end side connected to the first input port;
- a second output port connected to a second end side of the protection element, and provided to output electric power from the protection element to an outside of the optional device; and
- a second input port provided to supply the inputted electric power to the drive unit, and the connection cable includes:
- a first connecting path provided to connect the first output port to the first input port; and
- a safety switch provided to provide the output from the second output port to the second input port therethrough and to switch the connection between the second output port and the second input port based on an operating state of the optional device.

9. The printer system according to claim 8, wherein
the printer includes:
- a third input port,
- wherein the controller controls a supply of the electric power by the first power source, the second connecting path of the connection member connects the second output port of the optional device to the third input port of the printer, and the controller controls the supply of the electric power by the first power source in accordance with a signal inputted into the third input port.

10. The printer system according to claim 9, wherein
the printer includes:
- a second power source;
- a third output port from which electric power by the second power source is outputted to the outside of the printer; and
- a fourth input port connected to a ground, the connection member includes a third connecting path provided to connect the third output port to the fourth input port, and the controller determines whether the connection member is connected or not based on a detection result as to whether the output of the electric power by the second power source is present or not.

11. The printer system according to claim 9, wherein
the printer includes an electric-power cutoff unit that cuts off the electric power by the first power source, and
the controller controls the electric-power cutoff unit in accordance with the signal inputted into the third input port.

12. The printer system according to claim 9, wherein
the controller instructs a shift of an electric-power mode in accordance with the signal inputted into the third input port.

13. The printer system according to claim 8, wherein the connection member is a connection cable.

14. The printer system according to claim 8, wherein the second connecting path includes a safety switch provided to switch the connection between the second output port and the second input port based on an operating state of the optional device.

* * * * *